Sept. 20, 1949.  R. GILMONT  2,482,167
INDUSTRIAL MANOSTAT
Filed Jan. 17, 1948
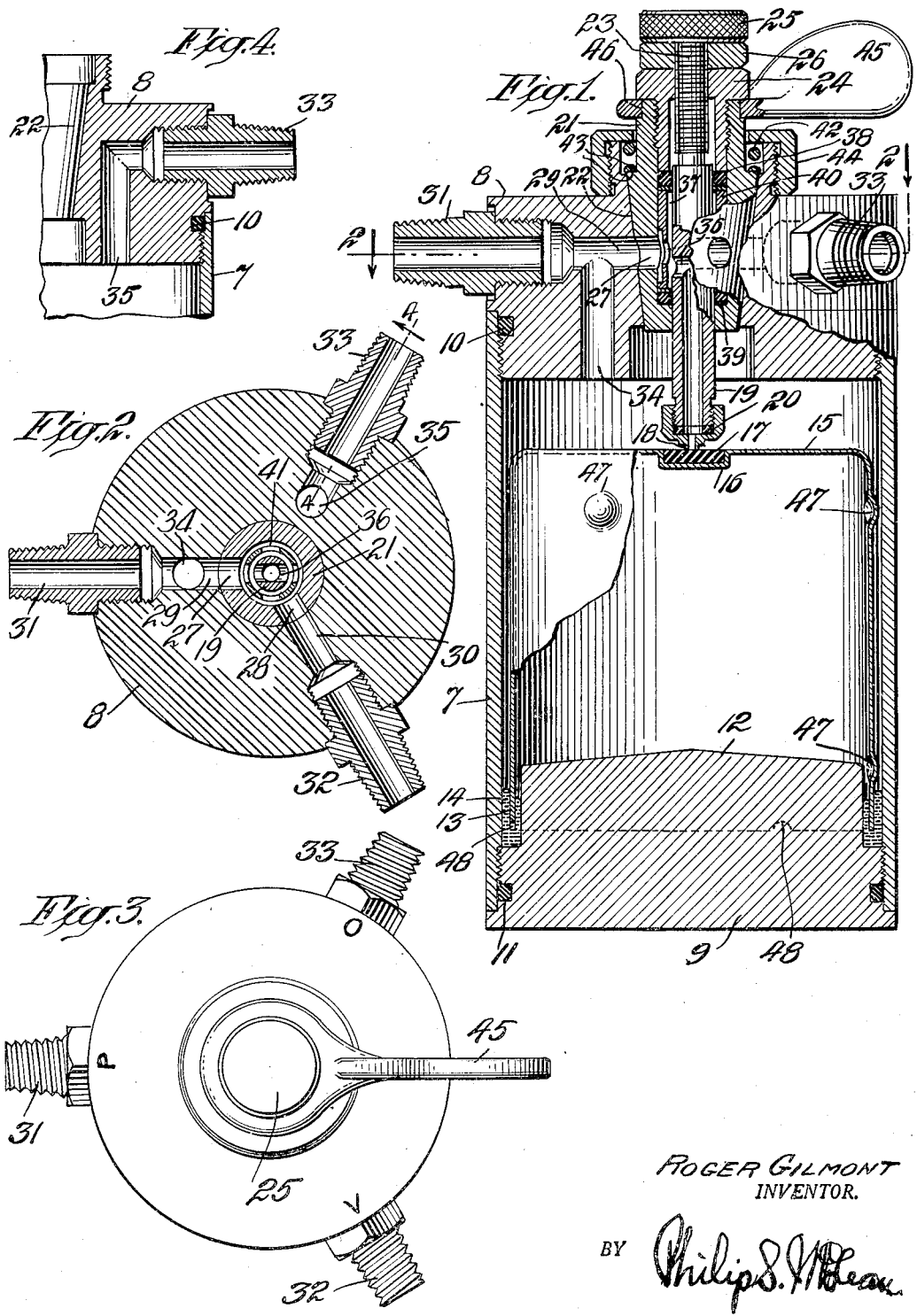
ROGER GILMONT
INVENTOR.
BY *Philip S. McLean*
ATTORNEY Patented Sept. 20, 1949

2,482,167

UNITED STATES PATENT OFFICE 2,482,167

INDUSTRIAL MANOSTAT

Roger Gilmont, New York, N. Y., assignor to The Emil Greiner Company, New York, N. Y., a corporation of New York Application January 17, 1948, Serial No. 2,863

11 Claims. (Cl. 137—153)

1

The invention herein disclosed is a manostat designed for industrial uses.

Objects of the invention, therefore, are to provide a pressure control device of substantial, rugged construction, accurate and reliable in operation and adapted to maintain constant pressure or vacuum within close operating ranges.

Further objects of the invention are to provide automatic pressure control of the character indicated, simple in construction and of reasonably low cost.

Particular objects of the invention are to provide a pressure-vacuum regulator of a unitary, self-contained character, requiring no accessory devices or special attention or servicing, adapted to be quickly and easily set for different desired pressure or vacuum and when so set, adapted to maintain that particular selected value without further attention.

Other desirable objects attained by the invention are set forth or will appear in the course of the following specification.

The drawing accompanying and forming part of the specification illustrates a present practical commercial embodiment of the invention. Structure, however, may be modified and changed as regards the immediate illustration, all within the true intent and broad scope of the invention as hereinafter defined and claimed.

Fig. 1 in the drawing is a vertical sectional view of one of the manostats with parts shown broken away;

Fig. 2 is a horizontal sectional view on substantially the plane of line 2—2 of Fig. 1;

Fig. 3 is a top plan view of the device;

Fig. 4 is a broken sectional detail as on substantially the plane of line 4—4 of Fig. 2.

In the illustration, the holder or body of the device is shown in the form of a tank made up of a shell 7 closed at top and bottom by screw plugs 8, 9, sealed by ring gaskets 10, 11.

The bottom plug is shown as having a central raised portion 12, leaving between it and the inner wall of the shell a relatively narrow, annular well 13 for a body of mercury or other sealing liquid 14.

An inverted bell 15 is disposed with its lower, open end dipping in the mercury seal to form a differentially operating float.

The top of this float is shown depressed at 16 to provide a seat for a sealing disc or valve element 17 cooperable with the companion valve or orifice element 18. The latter is shown in the form of a cap screwed over the lower end of a tube 19, with a gasket 20 in place therebetween.

2

The orifice tube 19 is shown as vertically adjustable in a tapered valve plug 21 rotatable in a corresponding tapered seat 22 in the upper or head portion 8 of the container or holder.

Specifically the orifice tube 19 is shown as having a screw mounting at 23 in the gland nut 24 which is screwed into the upper end of the valve plug 21. Turning of the orifice tube, as by means of the knob or handle 25 on the upper end of the same therefore will serve to raise or lower the tube in respect to the float sealed in the float chamber.

A lock nut 26 on the upper screw stem portion of the orifice tube serves, when screwed down on the head of the gland nut 24, to fasten the orifice tube in its vertically adjusted position.

The tapered valve element 21 is shown as radially ported at 27, 28, aproximately 120° apart to register with correspondingly spaced ports 29, 30, in the upper head, the latter ports having nipples or other fittings 31, 32, for connection with the system to be serviced and with a vacuum creating source.

A third external connection is provided at 33, approximately 120° from the service and vacuum connections 31, 32.

As shown in Figs. 1 and 2, a vertical passage 34 extends from the valve port or passage 29 downwardly into the float chamber and similarly, as appears in Figs. 2 and 4, a vertical passage 35 extends from the pressure connection 33 downwardly into the float chamber.

The orifice tube, as shown in Figs. 1 and 2, has a transverse passage 36 therethrough and the portion of the tapered valve plug in which this passage is located is hollowed out, as indicated at 37, to put the interior of the orifice tube into communication with both valve ports 27, 28.

To seal the orifice tube in the valve plug irrespective of its vertical adjustments, there are provided upper and lower sealing rings 38, 39, about the orifice tube above and below the cross opening 36 therein and an intervening spacing sleeve 40, these being acted upon by the inner end of the gland nut 24. This spacing sleeve is shown as having openings 41 therethrough to provide through communication from the orifice tube to the valve ports 27, 28.

The tapered valve plug 21 is shown as removably secured and yieldingly held in its seat by a spring 42 bearing on a shoulder 43 of the plug and confined by a containing screw ring 44.

A lever handle 45 fixed on the squared upper end portion 46 of the valve plug provides a means for turning and for indicating the position of the ported valve plug. In the case illustrated, the handle is set in line with the port 28, as indicated by the line 45 representing the handle in Fig. 2.

The float may be of relatively light sheet metal and it is shown as having outwardly dimpled portions at 47 to guide and center it in the holder. The lower edge of the float is indicated as having notches 48 therein for escape of gas bubbles through from one to the other side of the mercury seal during the equilibrating adjustments. Also, preferably, the edge of the float which dips into the mercury seal is centered therein with substantially equal surface areas of the seal inside and outside the float.

Operation

For both vacuum and pressure operations or for combination vacuum and pressure, the coupling 31 is connected with the system to be controlled. For vacuum operation the coupling 32 is connected with a vacuum pump or other vacuum source and a needle valve or equivalent may be applied to the coupling 33. These three positions are shown in the plan view, Fig. 3, designated "P", "V" and "O".

For pressure operation the coupling 32 is left open and a high pressure source is connected with coupling 33.

For combined pressure and vacuum operation coupling 32 is left connected to the vacuum source and coupling 33 connected to the high pressure source through the needle valve, or these two may be connected together by a single pumping source.

The normal procedure for vacuum operation is to first turn the handle 45 to the "V" position to place the port 28 in the valve plug 21 in line with the vacuum port 30, as in Fig. 2. Then with the needle valve at the "O" position closed, the pressure in the system is reduced to the approximate low value desired, such pressure being read on a suitable gage which may be connected in on the service line to the system—in other words, at "P". The handle is then turned to position "O" to carry the valve port 27 into register with the vacuum passage 30. In this position any evacuated gas must pass through the orifice 18. Normally there may be sufficient leaks in the system to cause the pressure to rise slightly and thus activate the float, but if not, an intentional leak may be introduced by slightly opening the needle valve at "O" and allowing gas to bleed in. The exact pressure desired is then obtained by adjusting the orifice screw. Turning the screw downward causes pressure to rise and raising the screw, conversely, causes pressure to fall. At the correct position the orifice screw may be secured by lock nut 26.

For pressure operation the equilibrating position of the valve is with the handle 45 at position "P", with valve port 28 in line with the system passage 29.

With the needle valve in the pressure line at "O" open, the pressure is allowed to build up to the approximate desired value, as may be shown on the gage on the system line at "P". The handle is then turned to the operating position "O" and the needle valve adjusted to allow gas to bleed in slowly. The pressure to be maintained is then accurately adjusted by means of the orifice screw, as above.

The principle of operation for either vacuum or pressure or any combination of vacuum and pressure is the same. Gas from a source of pressure higher than that of the system is permitted to bleed into the system slowly and excess gas is automatically permitted to escape by the Cartesian float at the proper rate to a source of pressure lower than the system. Because of the high sensitivity of the float the pressure is automatically maintained within precise limits, providing that the capacity of the orifice under the differential pressure head is sufficient to overcome the rate of gas flow into the system.

The construction illustrated provides for substitution of different orifices. Larger orifices provide greater capacity but lesser sensitivity. The choice of orifices enables close approximation of optimum conditions, the general rule being that the higher the pressure sought for operation, the smaller the orifice should be.

Different orifices may be readily interchanged upon removing the confining screw which permits bodily removal of the tapered valve plug carrying the orifice tube.

The complete instrument consists of but relatively few parts and it can be quickly installed by simply connecting it with the system and with requisite vacuum and pressure supply sources, as required. Structure is relatively simple, inexpensive and free of any complications. Once installed the operation is entirely automatic, requiring no servicing or special attention. The control is particularly sensitive, the gas bell which forms the float occupying most of the float chamber so as to be affected by relatively slight variations in pressure.

What is claimed is:

1. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber.

2. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a rotatable valve and said orifice tube being mounted for vertical adjustment in said rotatable valve.

3. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug rotatably mounted in the upper portion of the holder, said valve plug being ported to register with the service and vacuum connections and said orifice tube extending down through the center of said valve plug and in communication with the porting of said valve plug.

4. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug rotatably mounted in the upper portion of the holder and ported to register with the service and vacuum connections, said orifice tube being mounted for vertical adjustment in said valve plug and in communication with the ports in said plug.

5. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug rotatably mounted in the upper portion of the holder and having ports to register with the service and vacuum connections, said orifice tube extending down through said valve plug and in communication with said ports, packing means for said orifice tube including a gland nut, said orifice tube having a threaded engagement in said gland nut whereby it may be raised and lowered by rotative adjustments of the same and means for securing said orifice tube in various positions of adjustment.

6. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug mounted for rotatable adjustment in the upper portion of the holder and having ports to register with said service and vacuum connections, said orifice tube having a screw mounting in said valve plug whereby it may be raised or lowered by rotary adjustments of the same in said valve plug and said orifice tube further being in communication with said ports in the valve plug.

7. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug mounted for rotatable adjustment in the upper portion of the holder and having ports to register with the service and vacuum connections, said plug having a handle at the upper end of the same positioned to indicate the location of said ports with respect to said connections and said orifice tube having a vertically adjustable mounting in said valve plug and provided with exposed means at the upper end of the same for effecting vertical adjustments of the orifice tube in the valve plug.

8. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug mounted for rotatable adjustment in the upper portion of said holder and provided with ports, said service and vacuum connections including passages terminating in ports to register with the valve plug ports, said service and pressure connections including passages opening downwardly into the float chamber and the orifice tube being mounted in the valve plug and in communication with said ports in the valve plug.

9. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, including a valve plug mounted for rotatable adjustment in the upper portion of said holder and provided with ports, said service and vacuum connections including passages terminating in ports to register with the valve plug ports, said service and pressure connections including passages opening downwardly into the float chamber and the orifice tube being mounted in the valve plug and in communication with said ports in the valve plug and said orifice tube having a screw engagement in said valve plug whereby it may be raised and lowered with respect to the orifice closure by rotary adjustments of the same in the valve plug.

10. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said connections at the top of the float chamber, the base of said holder having a raised central portion leaving an annular surrounding well to hold the liquid seal.

11. A manostat of the character disclosed comprising a gas holder having a float chamber with a liquid seal at the bottom of the same and service, pressure and vacuum connections at the top of the same, an inverted gas bell floated in said liquid seal and provided with an orifice closure at the top of the same, an orifice tube extending downwardly into the float chamber and carrying an orifice opposed to said closure on the inverted gas bell and means for selectively effecting connection of said orifice tube with said conections at the top of the float chamber, said gas bell being notched at the lower edge to pass gas bubbles from one to the other side of the liquid seal and means for guiding the gas bell for vertical movement in the float chamber.

ROGER GILMONT.

No references cited.